United States Patent
Avent et al.

(10) Patent No.: US 8,619,080 B2
(45) Date of Patent: Dec. 31, 2013

(54) PHYSICALLY PRESENT GAME CAMERA

(75) Inventors: Jason Avent, Brighton (GB); Jonathan Gibson, Brighton (GB); Alkan Hassan, Brighton (GB); Richard Coles, London (GB); Iain Gilfeather, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 754 days.

(21) Appl. No.: 12/206,558

(22) Filed: Sep. 8, 2008

(65) Prior Publication Data

US 2010/0060661 A1    Mar. 11, 2010

(51) Int. Cl.
*G06T 15/10* (2011.01)
*G09G 5/00* (2006.01)
*A63F 9/24* (2006.01)
*G06F 3/048* (2013.01)
*G06G 7/48* (2006.01)

(52) U.S. Cl.
USPC ............. 345/427; 345/619; 463/33; 715/782; 715/848; 703/8

(58) Field of Classification Search
USPC ...................... 345/418–427, 619; 463/30–34; 715/781, 782, 848–851; 703/6–8
See application file for complete search history.

(56) References Cited

U.S. PATENT DOCUMENTS

| | | | | |
|---|---|---|---|---|
| 5,272,652 | A * | 12/1993 | Rosenshein et al. | 703/8 |
| 2002/0021298 | A1* | 2/2002 | Fukuda | 345/427 |
| 2002/0115486 | A1* | 8/2002 | Miyamoto et al. | 463/32 |
| 2004/0021680 | A1* | 2/2004 | Hara | 345/700 |
| 2007/0270215 | A1* | 11/2007 | Miyamoto et al. | 463/32 |
| 2008/0038701 | A1* | 2/2008 | Booth et al. | 434/219 |
| 2009/0017907 | A1* | 1/2009 | Shimizu | 463/31 |

FOREIGN PATENT DOCUMENTS

| | | |
|---|---|---|
| JP | 2004-334850 | 11/2004 |
| JP | 2006-268511 | 10/2006 |
| JP | 2008-033964 | 2/2008 |

* cited by examiner

*Primary Examiner* — Wesner Sajous
*Assistant Examiner* — Andrew Shin
(74) *Attorney, Agent, or Firm* — Patterson & Sheridan, LLP

(57) ABSTRACT

A system and method for viewing objects within a virtual environment are disclosed. A virtual camera and an object exist within the virtual environment. The camera is focused on the object such that the user of the virtual environment sees the object from the perspective of the camera. The virtual camera and the object being view are subject to the physics based rules of the simulation environment.

20 Claims, 8 Drawing Sheets

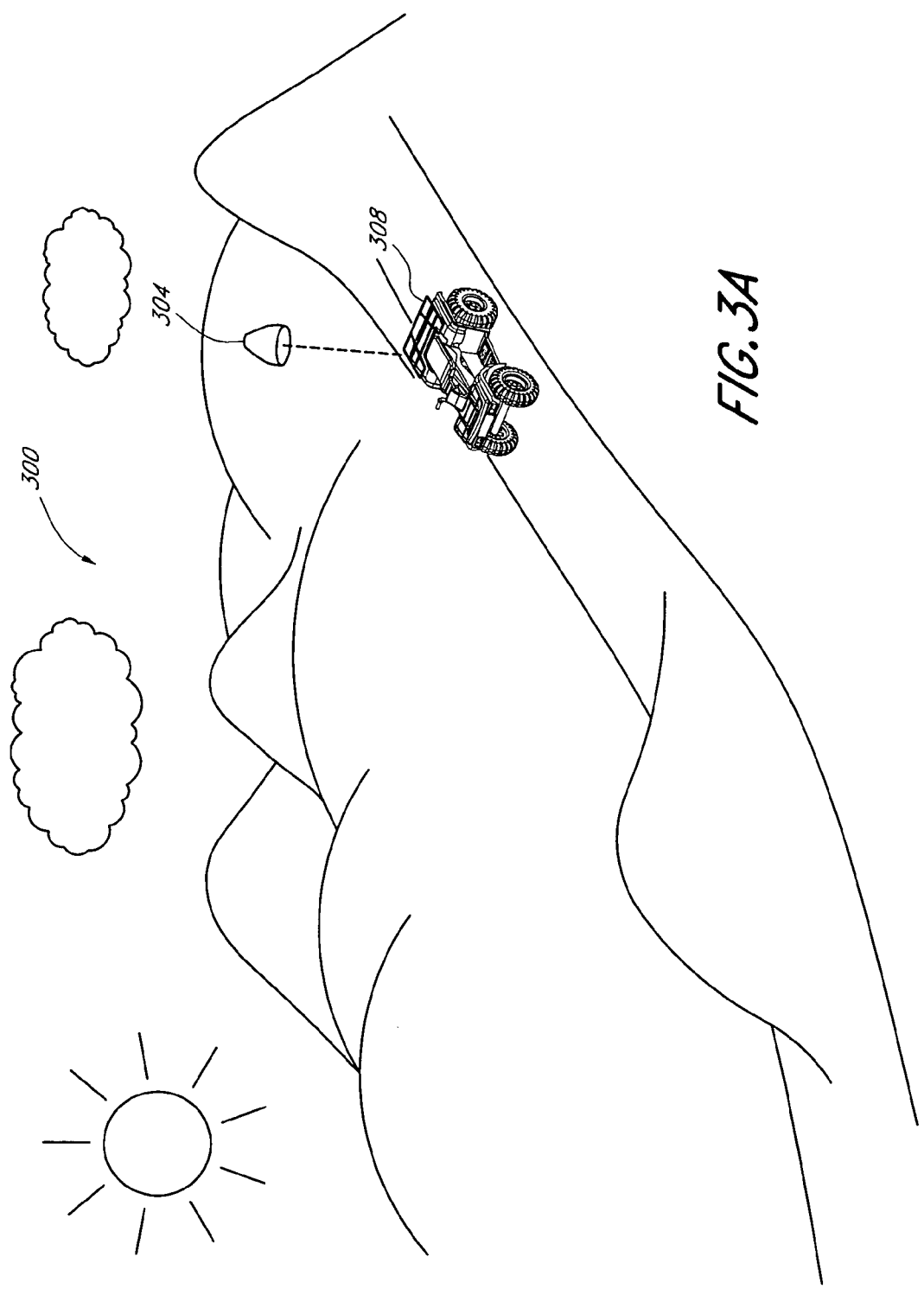

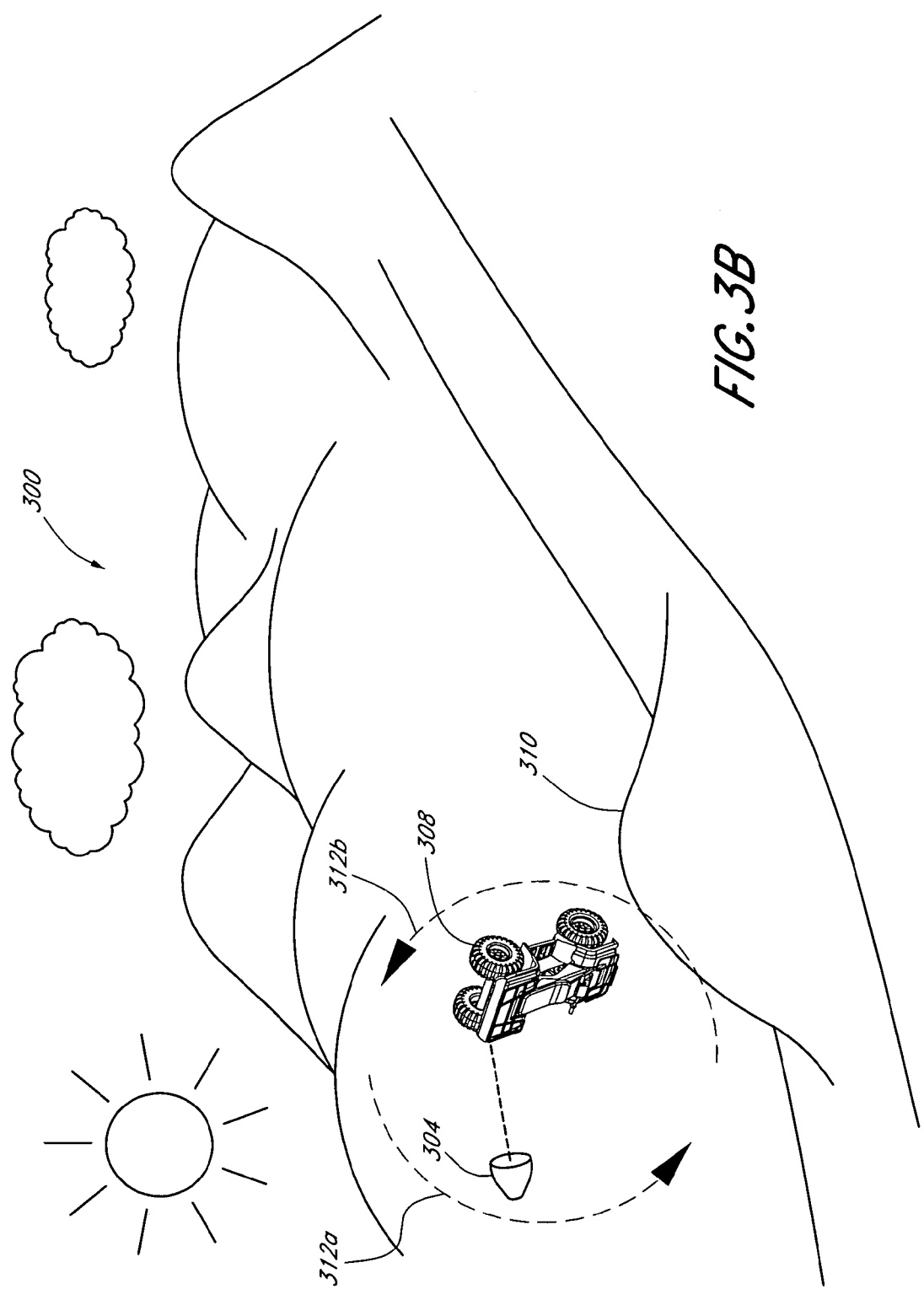

PHYSICALLY PRESENT GAME CAMERA

BACKGROUND

1, Field of the Invention

This application generally relates to computerized video games.

2, Description of the Related Technology

The proliferation of computing devices within our society has greatly increased in the past years. Where computing devices such were previously uncommon, now, a large percentage of society has access to or owns at least one computing device. Along with the growth of computing devices, the recreational use of computing devices has grown as well. Gaming consoles such as the Microsoft XBOX, Sony Playstation, Sony PSP, Nintendo Wii, Nintendo DS, and personal computer systems are now common place in our society. The number of users who now have access to such devices has grown significantly and as a result, there has been an explosion in the development of new computer and console games.

Although the number of computer and console games continues to grow, and the graphics and game play continue to improve, the systems and methods of viewing and displaying objects, events and occurrences in the games have generally remained the same. Thus, an improved method and system for viewing, and displaying objects and events is needed.

SUMMARY

A method of viewing an object in a virtual environment comprising setting a focus of a virtual camera on a physical object within the virtual environment, wherein the virtual camera is also within the virtual environment, and moving the virtual camera in response to a event while maintaining the set focus of the virtual camera, wherein the virtual camera and the physical object are configured to follow a set of physics based rules.

A system for simulating a physical environment comprising a virtual environment comprising a set of physics based rules, a processor configured to set a focus of a virtual camera on a physical object within the virtual environment, wherein the virtual camera is also within the virtual environment, and move the virtual camera in response to a event while maintaining the set focus of the virtual camera, wherein the virtual camera and the physical object are configured to follow a set of physics based rules.

A system for simulating a physical environment comprising a virtual environment comprising a set of physics based rules, a physical object within the virtual environment, configured to follow the set of physics based rules, and a virtual camera within the virtual environment, configured to follow the set of physics based rules, wherein the virtual camera is configured to remain focused on the physical object.

BRIEF DESCRIPTION OF THE DRAWINGS

FIG. 3A is a diagram illustrating a first embodiment.

FIG. 3B is a diagram illustrating a second embodiment.

DETAILED DESCRIPTION OF CERTAIN EMBODIMENTS

Figure 1:
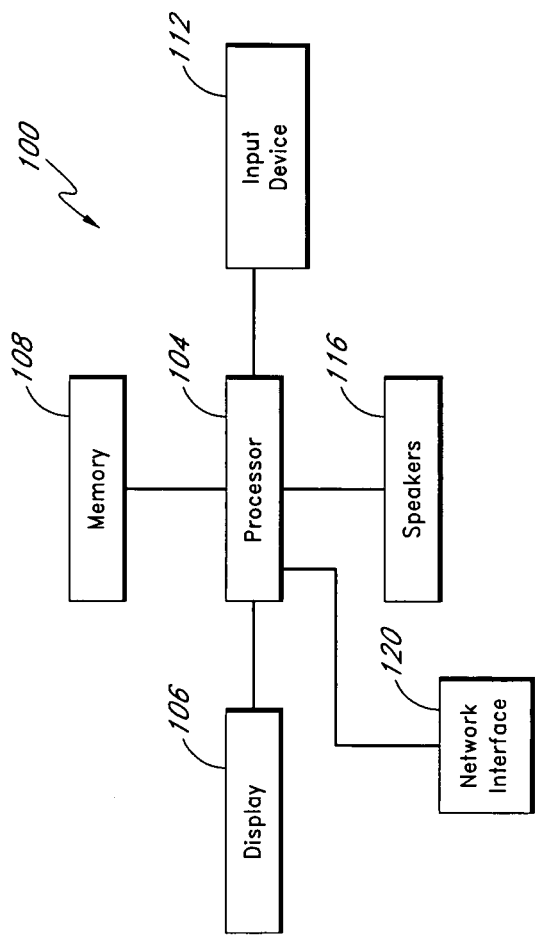
FIG. 1 is a block diagram of a computing device.

A typical method of viewing events and objects within virtual environments is to show the view from a first-person perceptive. Camera or view that a user sees is embedded within the object that is within the virtual environment. This is commonly seen in driving simulations/games or first-person shooter (e.g. combat) simulations/games. When an event occurs, the view is seen from the perspective of the object reacting to the event. Another typical method is position the camera or view of the object in a fixed location. For example, a view or camera may be positioned directly behind and slightly above an object. When an event occurs, such as a crash, collision or some other physical event, the camera or view does not change, but the physical object will react to the event. Thus, the view or camera will show the object reacting to the event, but the view or camera will remain stationary. A new system and method for viewing objects and events within a virtual environment is needed.

The following detailed description presents various descriptions of specific embodiments. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments may include several novel features, no single one of which is solely responsible for its desirable attributes or which is essential to practicing the inventions herein described.

The system comprises various software modules, components, hardware such as general purposes processors, ASICs, FPGAs, and applications as discussed in detail below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The software modules, components, hardware and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, BASIC, Visual Basic, Pascal, Ada, Java, HTML, XML and FORTRAN are industry standard programming languages for which many commercial compilers can be used to create executable code. In addition, the system may comprise software, hardware or a combination of both hardware and software.

FIG. 1 is a block diagram of a computing device 100. The computing device 100 may comprise a processor 104, a memory 108, an input module 112, a display module 106 and speakers 116. The processor 104 which may comprise any general purpose single or multi-chip microprocessor such as an ARM, Pentium®, Pentium II®, Pentium III®, Pentium IV®, Pentium® Pro, an 8051, a MIPS®, a Power PC®, an ALPHA®, an application specific integrated circuit (ASIC), or any special purpose microprocessor such as a digital signal processor, microcontroller, or a programmable gate array. Memory 108 may comprise a hard disk, RAM, ROM, a memory card, CD-ROM, DVD-ROM, or some other means for storing data. Input module 112 may comprise a keyboard, mouse, touch pad, touch screen, lever, knob, dial, slider, or some other mean for providing user input. Display module 106 may comprise an LCD monitor, a CRT monitor, a plasma monitor, a touch screen or some other means for displaying media. Speakers 116 may comprise speakers, headphones, or some other means for playing audio output. Network interface 120 may comprise a wired network card, a wireless network card, or some other means for communicating with a network. Network interface 120 may be connected to a local area network (LAN), or a wide area network (e.g. internet) or some other form of network. Network interface 120 may receive signals according to wired technologies including but not limited to Ethernet, telephone (e.g., POTS), and fiber optic systems, and/or wireless technologies including but not limited a code division multiple access (CDMA or CDMA2000) communication system, a GSM/GPRS (General Packet Radio Service)/EDGE (enhanced data GSM environment) or an IEEE 802.11b system.

Figure 2:
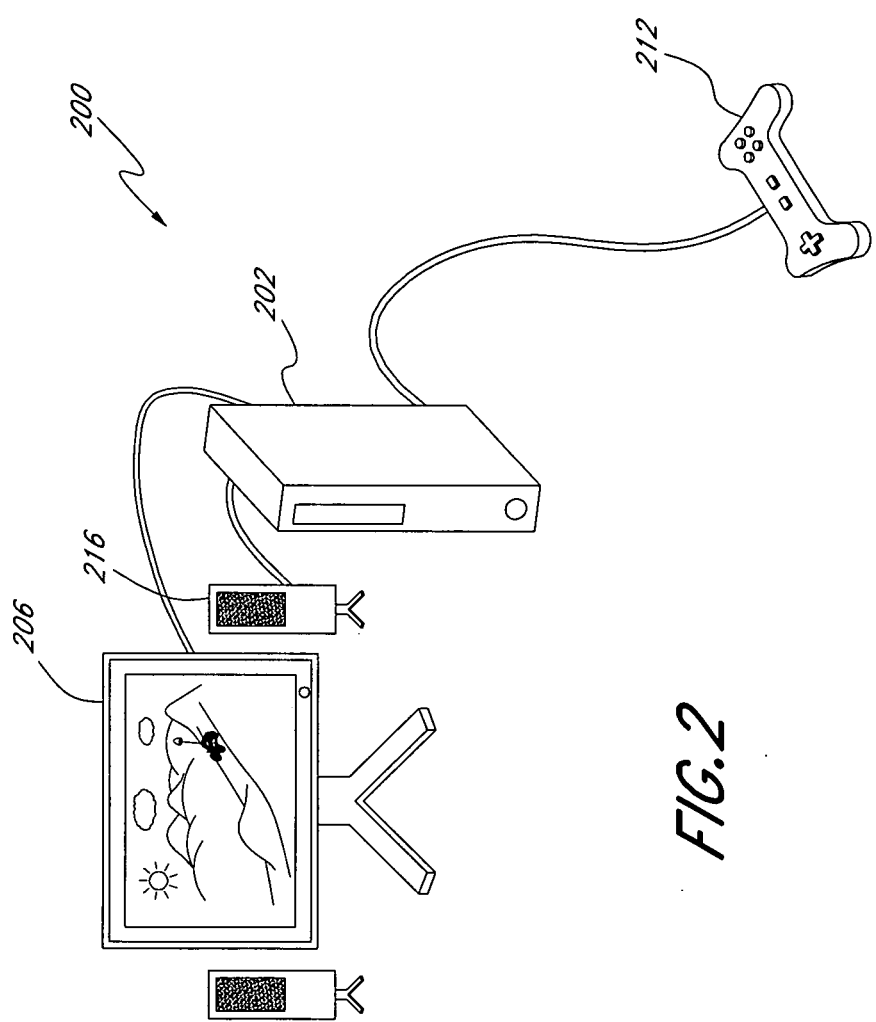
FIG. 2 is a diagram illustrating an example of a computing device.

FIG. 2 is a diagram illustrating an example of a computing system 200. Computing system 200 is similar to the computing device shown in FIG. 1. Computing system 200 comprises a display 206, an input device 212, speakers 216 and computing device box 202. Display 206 may be an LCD monitor, a CRT monitor, a plasma monitor, a touch screen monitor, or a projection screen. Input device 212 may be a game console controller. Other types of input devices may be used, such as keyboards, mice, motion sensitive controllers, touch pads, and touch screens. Computing device box 202 may comprise a processor and memory as shown in FIG. 1. Computing device 202 may also comprise a network interface as shown in FIG. 1.

Please note that in FIGS. 3A-3C and 4A-4B, an outside view of the virtual camera and physical object are shown. The outside view shown in FIGS. 3A-3C and 4A-4B is not the actual view that will be displayed by the systems and methods described herein. The outside view is used in the figures to better illustrate the technical features of certain embodiments.

FIG. 3A is a diagram illustrating a first embodiment. In FIG. 3A, an outside view of a virtual environment 300 is shown. In this embodiment, the virtual environment is a simulation of an all-terrain vehicle (ATV) driving through the virtual environment 300. An outside view of the virtual environment is show in order to show both the virtual camera 304 and the physical object 308. A user using the systems and methods as described herein will view the virtual environment and all events within the virtual environment from the perspective of the virtual camera 304.

The virtual environment 300 may be part of a video or computer game. The virtual environment 300 may also be part of a simulator or some other simulation environment. The virtual environment 300 may display a variety of types of terrain. In the embodiment shown in FIG. 3A, an area with a skyscape, hills and a road are displayed. In general, any type of terrain may be displayed in virtual environment 300. For example, sand dunes could be displayed in virtual environment 300. Alternatively, the terrain may be water-based such as the surface of an ocean, river or lake. The terrain may also be an open area such as in space or in the sky (e.g. for flight simulation games or flight simulators).

The virtual environment 300 also comprises a set of physics based rules. The physics based rules may dictate the physical behavior of objects within the virtual environment. For example, a rule for gravity rules may be used to determine how an object will fall within the virtual environment 300. Other rules may be used to determine how things such as smoke, water, or gases may act within the virtual environment 300. There may be rules to determine how fast objects within the virtual environment 300 move when a certain amount of thrust is provided, or to determine the behavior of objects when they collide in virtual environment 300. The physics based rules may encompass all areas of physics such as physical motion (e.g. acceleration, friction and deceleration) to behavior of electromagnetic waves (e.g. such as light). In general, physics based rules may be used to determine the physical behavior of all objects within the virtual environment 300.

Although ATV 308 is illustrated in FIGS. 3A-3C, and 4A-4B, the virtual camera may be focused on any physical object within the virtual environment 300. For example, if the virtual environment 300 comprised a flight simulator, then the virtual camera 304 may be focused on a plane. If the virtual environment comprised a driving game, the virtual camera 304 may be focused on a car. This application does not limit the types of terrain or physical objects that may be part of the virtual environment 300.

In addition, the physics based rules may comprise a rule or set of rules that dictates the physical behavior of objects within the virtual environment 300. A virtual environment 300 is not required to have certain types of rules. For example, in a space flight simulation, the virtual may not have any rules pertaining to gravity. It may also not have any rules pertaining to friction and its effects on physical objects. This application in no way limits the number or types of physics based rules that may exist within virtual environment 300.

In FIG. 3A, ATV 308 may be a physical object within virtual environment 300. ATV 308 is subject to the physics based rules of virtual environment 300 and will interact with other objects and the virtual environment 300 in accordance with the physics based rules. A virtual camera 304 is also within the virtual environment 300. The virtual camera 304 may be another physical object within virtual environment 300. Virtual camera 304 is focused on the ATV 308. In other words, a user using the system and methods described herein would be viewing the ATV 308 from the perspective of virtual camera 304. In this embodiment, the virtual camera 304 is placed in a particular position with respect to ATV 308. As ATV 308 moves through virtual environment 300, ATV 308 is subject to the physics based rules. If ATV 308 were to drive off a cliff that was in virtual environment 300, it would fall and impact the ground according to the physics based rules defined for virtual environment 300. As the virtual camera 304 moves through the virtual environment 300, it remains focused on ATV 308 and is also subject to the physics based rules.

In one embodiment, virtual camera 304 may be "tethered" to ATV 308. For example, one may visualize ATV 308 and virtual camera 304 as being connected by an "invisible rubber band." As ATV 308 moves within virtual environment 300, virtual camera 304 will move along with ATV 308. When ATV 308 accelerates according to the physics based rules, virtual camera 304 may not accelerate at first but as ATV 308 pulls on the "invisible rubber band" connected to virtual camera 304, virtual camera may then begin accelerating according to the same rules.

In another embodiment, the virtual camera 304 may be tethered to ATV 308 in a more static configuration. For example, one may visualize ATV 308 and virtual camera 304 as being connected by an "invisible rod". As ATV 308 moves within virtual environment 300, virtual camera 304 will move along with ATV 308. When ATV 308 accelerates according to the physics based rules, virtual camera 304 may accelerate at the same rate as ATV 308. In a related embodiment, the distance between virtual camera 304 may be fixed and may not vary even when events occur within the virtual environment 300. The virtual camera 304 may move to any location around ATV 308 as a result of events and/or the motion of ATV 308, but the distance between the virtual camera 304 and the ATV 308 will remain the same.

In another example, centrifugal force may be one of the physics based rules in virtual environment 300. As ATV 308 turns to the right, the ATV 308 may pull on the "invisible rubber band" connected to virtual camera 304 and virtual camera 304 may swing to the left as a result of the centrifugal force.

In a related example, as ATV 308 turns to the night, the virtual camera 304 may swing to the left. As virtual camera 304 swings to the left, it may collide with an object within the virtual environment, such as a wall, rock or building. The behavior of the virtual camera 304 as it collides with the object may be governed by the physics based rules. The virtual camera 304 may collide with the object and stop moving. The movement of ATV 308 is not affected by the collision of virtual 304 with the object. Because ATV 308 is a separate object from the virtual camera 304 within the virtual environment 300, it may interact with the virtual environment 300, objects within the virtual environment 300 and the terrain independently of virtual camera 304, and vice versa. Thus, ATV 308 may continue turning right while virtual camera 304 collides with the object and stops moving. Virtual camera 304 may resume moving as ATV 308 moves away and pulls virtual camera 304 away from the object it collided with. Although virtual camera 304 remains tethered to and focused on ATV 308, virtual camera 304 is a separate physical object and thus may interact with the objects and terrain within the virtual environment 300 independently of ATV 308.

In one embodiment, the motion of the ATV 308 may affect motion of the virtual camera 304. For example, ATV 308 may drive off a cliff and start to slowly flip forward as it falls through virtual environment 300. As the ATV 308 slowly tilts forward, the virtual camera 304 may also start to move forward in an arc corresponding to the tile of ATV 308. The movement of virtual camera 304 does not require any collision or other interaction with other objects and the terrain within the virtual environment 300. The virtual camera 304 may move in an arc corresponding to the motion of the ATV 308 because it is loosely tethered to ATV 308 and the motion of ATV 308 affects the motion of virtual camera 304. In another embodiment, the virtual camera 304 may not move from its position unless it impacts or interacts with other objects and/or the terrain in virtual environment 300.

In one embodiment, an event (e.g. impact, collision, turn) that occurs to ATV 308 may trigger the motion of virtual camera 304. For example, as ATV 308 moves through virtual environment 300, the camera may be in a fixed location above and behind the ATV 308 as shown in FIG. 3A. ATV 308 may hit an object within virtual environment 300 and in accordance with the physics based rules, may crash and interact with the terrain and/or other objects within virtual environment 300. Once the crash occurs, a movement of the virtual camera 304 may be triggered. For example, virtual camera 304 may have been trailing ATV 308. As the crash occurs, virtual camera 304 may be thrown forward and over ATV 308. Once virtual camera 304 starts to move within the virtual environment 304, it may interact with objects and the terrain independently of ATV 308, but still remain focused on ATV 308. For example, the virtual camera 304 may be thrown to the side of ATV 308, and it may start to spin as it is thrown to the side. The virtual camera 304 may then collide with rocks, trees, buildings or other objects within the virtual environment and its movement will be affected independently of ATV 308. As virtual camera 304 collides with objects, spins and bounces around the virtual environment 300, it will remain focused on ATV 308.

FIG. 3B is a diagram illustrating a second embodiment. In the embodiment shown in FIG. 3B, ATV 308 has collided with a rock 310 in the virtual environment 300. As a result of this collision and the physics based rules within the virtual environment 300, ATV 308 has now crashed and is tumbling through virtual environment 300. Due to the physics based rules for virtual environment 300, virtual camera 304 and ATV 308 are tumbling over each other. Direction arrow 312*a* indicates the direction of motion for virtual camera 304. Direction arrow 312*b* indicates the direction of motion for ATV 308. Virtual camera 304 and ATV 308 will interact with objects and the terrain in virtual environment 300 independent of each other. For example, virtual camera 304 may impact the terrain in virtual environment 300 first. According to the physics based rules within virtual environment 300, the virtual camera 304 can not go through the terrain, so it will impact the terrain and bounce around according to the rules. Although virtual camera 304 has impacted the terrain, ATV 308 is still tumbling in an arc as shown by direction arrow 312*b*, ATV 308 may continue to move in an arc above virtual camera 304 which has impacted the terrain. Virtual camera 304 will remain focused on ATV 308 it moves along the arc shown by direction arrow 312*b*, As both the virtual camera 304 and ATV 308 tumble within virtual environment according to the physics based rules, they may interact with the objects in the virtual environment 300 and the terrain in completely different ways, and virtual camera 304 will remain focused on ATV 308.

Figure 3C:
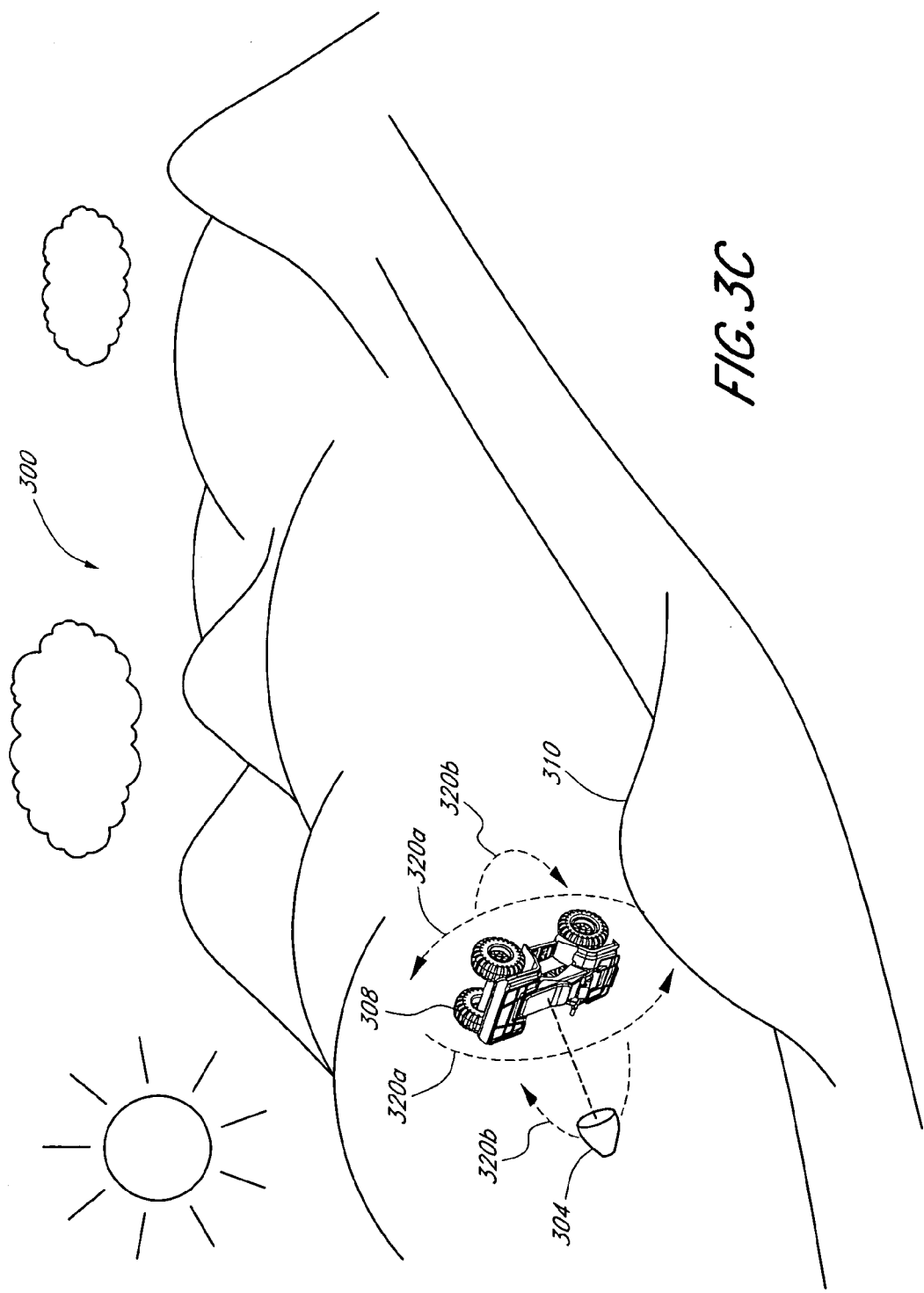
FIG. 3C is a diagram illustrating a third embodiment

FIG. 3C is a diagram illustrating a third embodiment. In the embodiment shown in FIG. 3C, ATV 308 has collided with a rock 310 in the virtual environment 300. As a result of this collision and the physics based rules within the virtual environment 300, ATV 308 has now crashed and is tumbling through virtual environment 300. Due to the physics based rules for virtual environment 300 and the way which ATV 308 was moving through virtual environment 300 prior to the crash, ATV 308 is tumbling such as that it is flipping head over tail as shown by direction arrows 320*a*, Virtual camera 304 may have impacted another physical object within the virtual environment. Due to its collision and the physics based rules, virtual camera 304 is moving in a circular orbit around ATV 308 as indicated by direction arrows 320*b*, Because virtual camera 304 is a physical object within the virtual environment 300 and ATV 308 is also a physical object within the virtual environment 300, they may react independently from each other as seen shown by their directions of motion, 320*a* and 320*b*, As seen in FIG. 3C, virtual camera 304 remains focused on ATV 308.

Figure 4A:
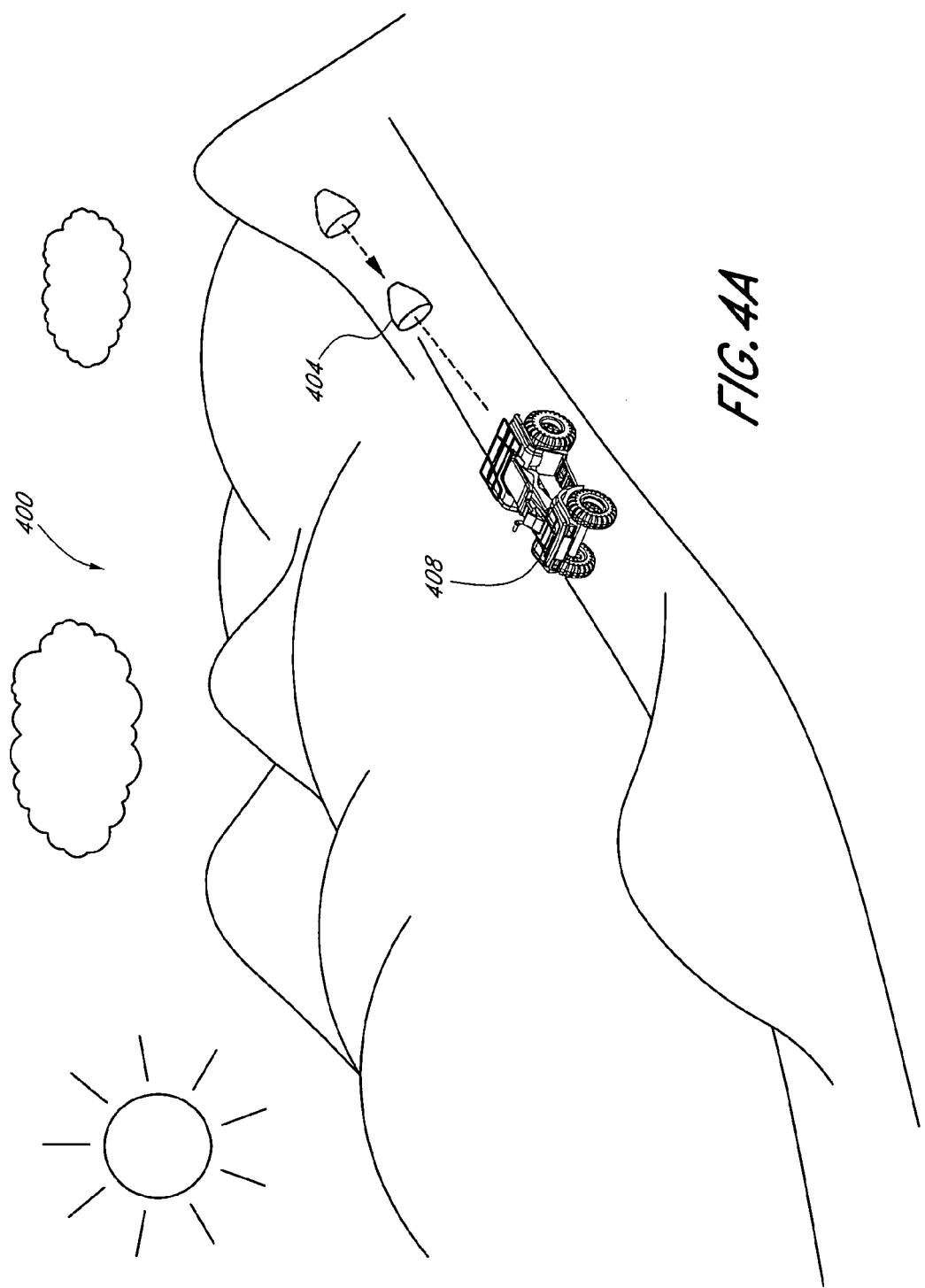
FIG. 4A is a diagram illustrating a fourth embodiment

FIG. 4A is a diagram illustrating a fourth embodiment. In the embodiment shown in FIG. 4A, the distance between virtual camera 404 and ATV 408 may change depending on the physics based rules and the interactions of virtual camera 404 and ATV 408 with objects within the virtual environment 400 and/or the terrain. For example, virtual camera 404 may be positioned behind ATV 408 and ATV 408 may be in front of an object within the virtual environment 400. As ATV 408 backs up, virtual camera 404 will collide with the object first and it will not move farther based on the rules. As ATV 408 continues backing up, the distance between the virtual camera 404 and the ATV 408 will decrease, as the rules for the virtual environment 400 will not allow the virtual camera 404 to move past the object it collided with.

In another embodiment, a user of the virtual environment 400 may set the distance between the virtual camera 404 and the ATV 408. For example, a user may decide to set the initial position of the camera to be twenty feet behind ATV 408. At some point during the user of the virtual environment 400, the user may decide that twenty feet is too far away and does not give an adequate view of ATV 408. The user may decrease the distance to fifteen feet. In addition, the user may set a minimum and/or maximum distance for the virtual camera 404. For example, a user could set the virtual camera to be no closer then five feet away from the ATV 408 and no further then twenty away from ATV 408. These minimum and maximum distances between the virtual camera 404 and ATV 408 may be maintained regardless of how the both interact with the objects in the virtual environment 400 and the terrain. For example, even if a crash occurs, the distance between the virtual camera 404 and the ATV 408 will may not be less then five feet.

Figure 4B:
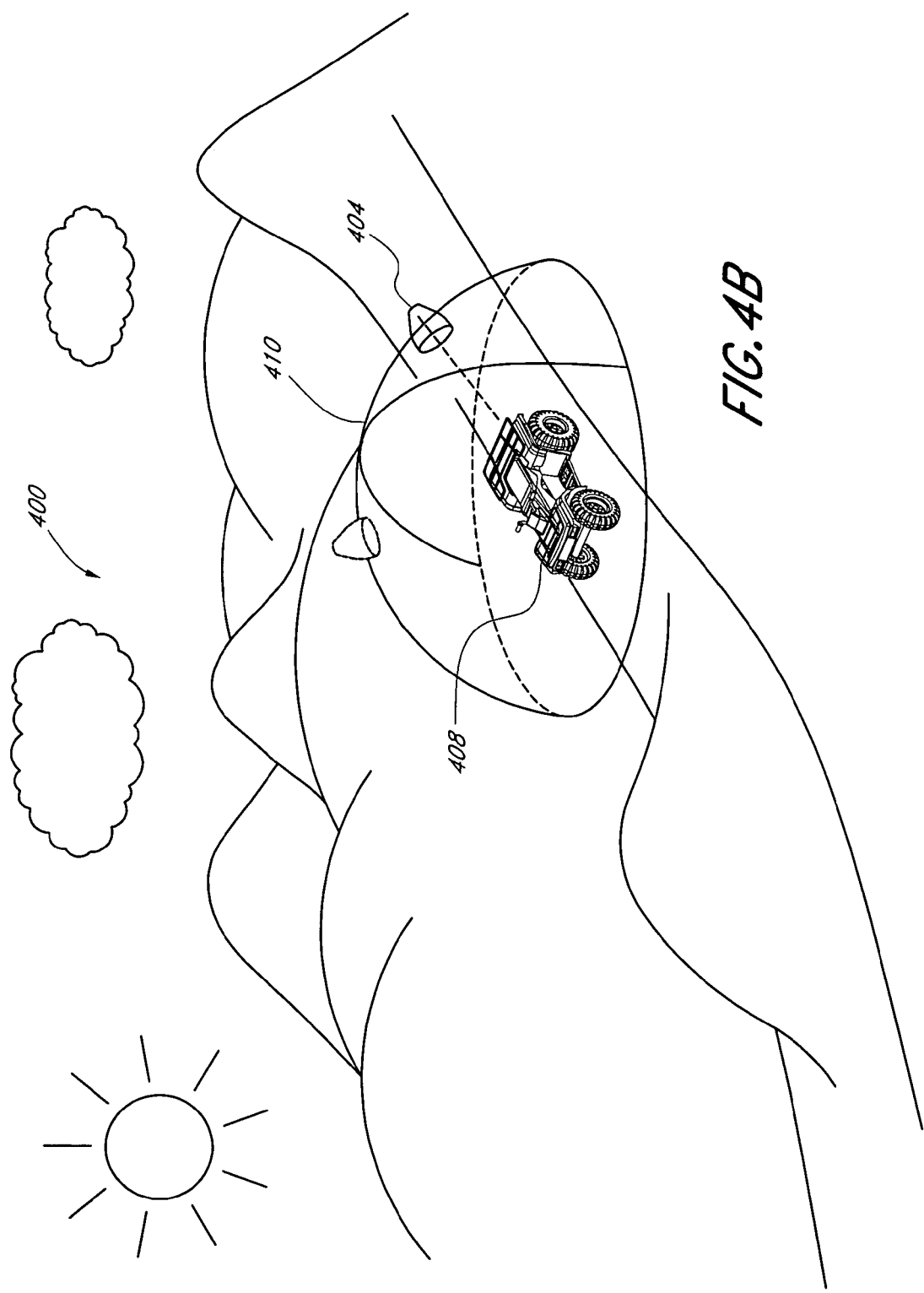
FIG. 4B is a diagram illustrating a fifth embodiment.

FIG. 4B is a diagram illustrating a fifth embodiment. In the embodiment shown in FIG. 4B, the virtual camera 408 may be positioned in a variety of locations around ATV 408. As described in FIGS. 3A-3C, virtual camera 404 can move around in the virtual environment 400 independent of ATV 408. Virtual camera 404 may move around ATV 408 as a result of its interactions with other physical objects within virtual environment 400 or the terrain as described in FIGS. 3A-3C. Virtual camera 404 may be positioned anywhere within the semi-sphere 410. As the distance between the virtual camera 404 and the ATV 408 increases as discussed in FIGS. 3A-3C, the radius of the semi-sphere 410 may increase as well. Correspondingly, as the distance between the virtual camera 404 and the ATV 408 decreases as discussed in FIGS. 3A-3C, the radius of the semi-sphere 410 may decrease. Virtual camera 404 may remain focused on ATV 408 regardless of its position around ATV 408.

Although not shown in FIG. 4B, the virtual camera may be positioned anywhere within the a full sphere around an object. For example, in a flying simulation, the virtual environment may comprise a skyscape. In the skyscape, the virtual camera may be positioned under the object it is focused on, thus resulting in a full sphere of positions for the virtual camera. The example shown in FIG. 4B only allows a semi-sphere of positions due to the terrain in the simulation environment 400.

In another embodiment, a user of the virtual environment 400 may set the location of virtual camera 404 and the ATV 408. For example, a user may set the location of virtual camera 404 to be behind and slightly above the ATV 408. In another example, the user may set the location of the virtual camera to be to the left of and level with ATV 408. The user may set a limit on the locations that virtual camera 404 may move to around ATV 408. For example, the user may set the virtual camera 404 to only be movable in areas behind the ATV 408. This would result in the virtual camera 404 only providing a view of the back areas of the ATV 408. These limits in the location of the virtual camera 404 may be maintained regardless of how the virtual camera 404 and the ATV 408 interact with the objects in the virtual environment 400 and the terrain. For example, even if a crash occurs, the virtual camera 404 may never move such that it is positioned in front of the ATV 408.

Figure 5:
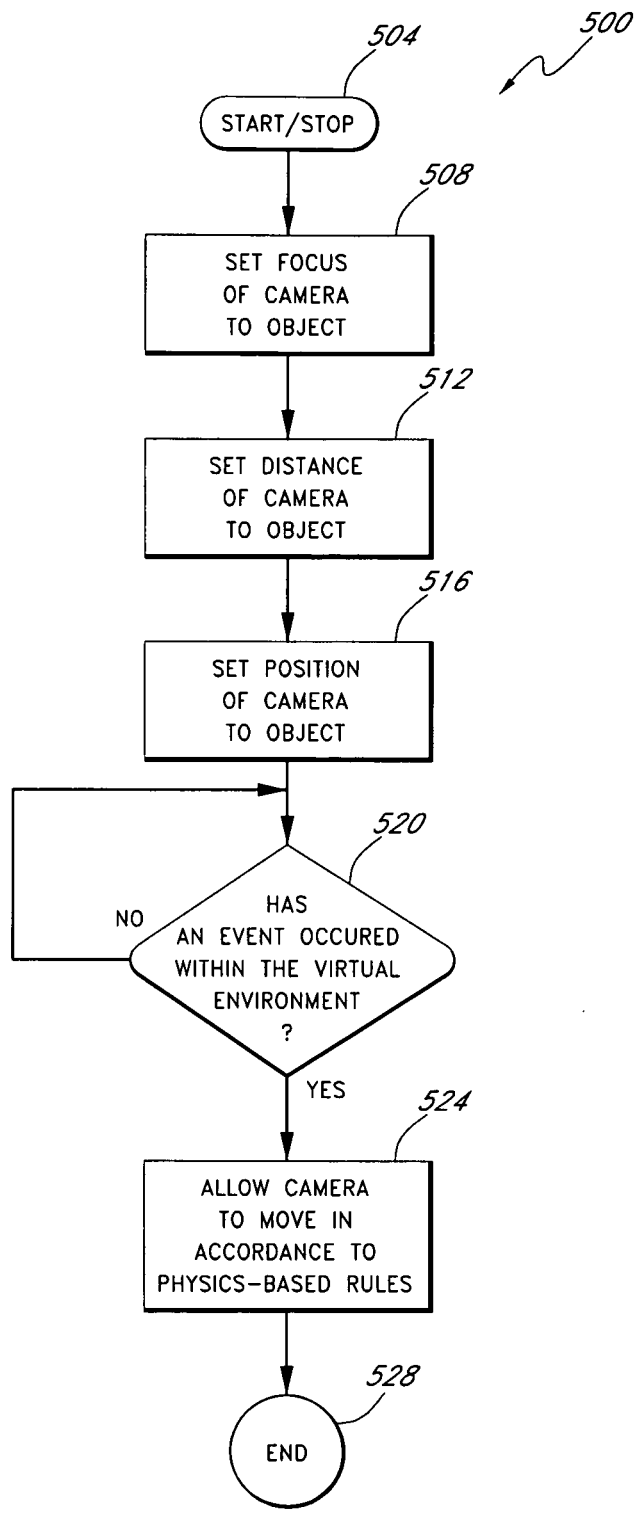
FIG. 5 is a flow diagram of an embodiment of a process for viewing an object in a virtual environment.

FIG. 5 is a flow diagram of an embodiment of a process 500 for viewing an object in a virtual environment. In FIG. 5A, a user is using a simulation environment such as a driving video game. The user is controlling an object within the simulation environment such as an ATV or a car. As the user uses the simulation environment, his view of the object may follow the method shown in FIG. 5B.

The process 500 starts at starting block 504 and moves to block 508. At block 508, the user sets the focus of the virtual camera to a particular object. The focus may be set on any object within the virtual environment. The focus of the virtual camera may be set by the user or it may be set automatically by the virtual environment. In addition, the user may reset the focus of the virtual camera to another object within the virtual environment. The process then blocks to block 512 where the user may set the distance from the virtual camera to the object. The user may set the distance manually or a default distance may be used. The process then moves to block 516 where the user may set the position of the virtual camera relative to the object. For example, the user may set the camera to be directly behind but level with the object. The position of the camera may be manually set by the user or a default position may be used. The process then moves to block 520. At block 520, the process 500 waits for an event to occur. An event may comprise a movement of the object within the virtual environment. For example, the event may be that the car object made a left turn, or that the car object crashed into a wall. If no event has occurred, the process loops back and waits for an event to occur. When an event occurs, the process 500 moves to block 524. At block 524, the an event such as a crash or collision has occurred. The camera object may then move around the object as described in FIGS. 3A-4B according to the physics based rules. The camera may interact with other objects and terrain within the virtual environment according to the physics based rules. The process the moves to the end block 528.

The above-described method may be realized in a program format to be stored on a computer readable recording medium that includes any kinds of recording devices for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, a skilled technologist will realize that there are many ways to partition the system, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A computer-implemented method for viewing a virtual object within a virtual environment, comprising:

setting a focus of a virtual camera that resides within the virtual environment on a first virtual object that also resides within the virtual environment, such that the virtual camera provides a third-person view of the first virtual object as the first virtual object moves through the virtual environment; and simulating a physical collision between the virtual camera and one or more other virtual objects residing within the virtual environment according to a set of physics based rules for the virtual environment, wherein the simulated physical collision is independent of any simulated physical interaction between the one or more other virtual objects and the first virtual object, and wherein the virtual camera maintains the set focus on the first virtual object and the third-person view of the first virtual object throughout the simulated physical collision.

2. The computer-implemented method of claim 1, wherein simulating the physical collision between the virtual camera and the one or more other virtual objects further comprises changing a distance between the virtual camera and the first virtual object, while the virtual camera maintains the set focus on the first virtual object and the third-person view of the first virtual object.

3. The computer-implemented method of claim 1, wherein simulating the physical collision between the virtual camera and the one or more other virtual objects further comprises rotating the virtual camera around the first virtual object, while the virtual camera maintains the set focus on the first virtual object and the third-person view of the first virtual object.

4. The computer-implemented method of claim 1, wherein at least one of the set of physics based rules is a rule of gravity that is used to determine how objects fall within the virtual environment, and wherein the simulated physical collision between the virtual camera and the one or more other virtual objects is further based on the rule of gravity.

5. The method of claim 1, wherein the first virtual object is a virtual vehicle controlled by a user.

6. The method of claim 5, further comprising:
responsive to the virtual vehicle crashing within the virtual environment, causing a movement of the virtual camera based on the crash, and wherein the virtual camera maintains the set focus on the first virtual object and the third-person view of the first virtual object throughout the movement, and wherein the virtual camera collides with the one or more other virtual objects during the movement.

7. The method of claim 1, wherein the virtual camera is tethered to the first virtual object within the virtual environment, such that a rate of acceleration of the virtual camera is based on both a rate of acceleration of the first virtual object and a distance between the virtual camera and the first virtual object.

8. The method of claim 1, further comprising:
receiving a minimum distance to be maintained between the virtual camera and the first virtual object;
receiving a maximum distance to be maintained between the virtual camera and the first virtual object; and
controlling a position of the virtual camera, such that a distance between the virtual camera and the first virtual object remains between the minimum distance and the maximum distance, wherein the distance between the virtual camera and the first virtual object remains between the minimum distance and the maximum distance throughout the simulated physical collision.

9. A system for simulating a physical environment comprising:
a virtual environment comprising a set of physics based rules;
a processor of configured to:
set a focus of a virtual camera that resides within the virtual environment on a first virtual object that also resides within the virtual environment, such that the virtual camera provides a third-person view of the first virtual object as the first virtual object moves through the virtual environment; and
simulate a physical collision between the virtual camera and one or more other virtual objects residing within the virtual environment according to a set of physics based rules for the virtual environment, wherein the simulated physical collision is independent of any simulated physical interaction between the one or more other virtual objects and the first virtual object, and wherein the virtual camera maintains the set focus on the first virtual object and the third-person view of the first virtual object throughout the simulated physical collision.

10. The system of claim 9, wherein the processor is further configured to simulate the physical collision between the virtual camera and the one or more other virtual objects by changing a distance between the virtual camera and the first virtual object, while the virtual camera maintains the set focus on the first virtual object and the third-person view of the first virtual object.

11. The system of claim 9, wherein the processor is further configured to simulate the physical collision between the virtual camera and the one or more other virtual objects by rotating the virtual camera around the first virtual object, while the virtual camera maintains the set focus on the first virtual object and the third-person view of the first virtual object.

12. The system of claim 9, wherein at least one rule in the set of physics based rules is changed in order to influence at least one physical behavior of virtual objects within the virtual environment.

13. A system for simulating a physical environment comprising:
a virtual environment comprising a set of physics based rules;
a first virtual object that resides within the virtual environment; and
a virtual camera that also resides within the virtual environment, wherein the virtual camera is configured to set a focus of the virtual camera on the first virtual object, such that the virtual camera provides a third-person view of the first virtual object as the first virtual object moves through the virtual environment, wherein the virtual camera is configured to collide with one or more other virtual objects residing within the virtual environment according to the set of physics based rules, independent of any simulated physical interaction between the one or more other virtual objects and the first virtual object, wherein the virtual camera is configured to remain focused on the first virtual object and to retain the third-person view of the first virtual object throughout the collision.

14. The system of claim 13, wherein the virtual camera and is configured to change a distance between the virtual camera and the first virtual object, as a result of the collision between the virtual camera and the one or more other virtual objects residing within the virtual environment.

15. The system of claim 13, wherein the virtual camera is configured to rotate around the first virtual object, as a result of the collision between the virtual camera and the one or more other virtual objects residing within the virtual environment.

16. The system of claim 13, wherein at least one rule in the set of physics based rules is changed in order to influence at least one physical behavior of virtual objects within the virtual environment.

17. A non-transitory computer-readable medium storing program instructions that, when executed by a processor, cause the processor to simulate a virtual object within a virtual environment by performing the steps of:

setting a focus of a virtual camera that resides within the virtual environment on a first virtual object that also resides within the virtual environment, such that the virtual camera provides a third-person view of the first virtual object as the first virtual object moves through the virtual environment; and simulating a physical collision between the virtual camera and one or more other virtual objects residing within the virtual environment according to a set of physics based rules for the virtual environment, wherein the simulated physical collision is independent of any simulated physical interaction between the one or more other virtual objects and the first virtual object, and wherein the virtual camera maintains the set focus on the first virtual object and the third-person view of the first virtual object throughout the simulated physical collision.

18. The non-transitory computer-readable medium of claim 17, wherein simulating the physical collision between the virtual camera and the one or more other virtual objects further comprises changing a distance between the virtual camera and the first virtual object, while the virtual camera maintains the set focus on the first virtual object and the third-person view of the first virtual object.

19. The non-transitory computer-readable medium of claim 17, wherein simulating the physical collision between the virtual camera and the one or more other virtual objects further comprises rotating the virtual camera around the first virtual object, while the virtual camera maintains the set focus on the first virtual object and the third-person view of the first virtual object.

20. The non-transitory computer-readable medium of claim 17, further comprising the step of changing at least one rule in the set of physics based rules in order to change at least one physical behavior of virtual objects within the virtual environment.

* * * * *